(No Model.) 4 Sheets—Sheet 1.

C. D. MATTISON.
CONDUIT FOR ELECTRIC RAILWAYS.

No. 565,085. Patented Aug. 4, 1896.

Witnesses
E. L. Thrasher
Alec N. Dobson

Inventor
C. D. Mattison
by Foster Freeman
Attorneys

THE NORRIS PETERS CO., PHOTO-LITHO., WASHINGTON, D. C.

(No Model.) 4 Sheets—Sheet 2.
C. D. MATTISON.
CONDUIT FOR ELECTRIC RAILWAYS.

No. 565,085. Patented Aug. 4, 1896.

Witnesses
E. L. Thrasher
Alex N. Dobson

Inventor
C. D. Mattison
by Foster & Freeman
Attorneys (No Model.) 4 Sheets—Sheet 3.
C. D. MATTISON.
CONDUIT FOR ELECTRIC RAILWAYS.
No. 565,085. Patented Aug. 4, 1896.
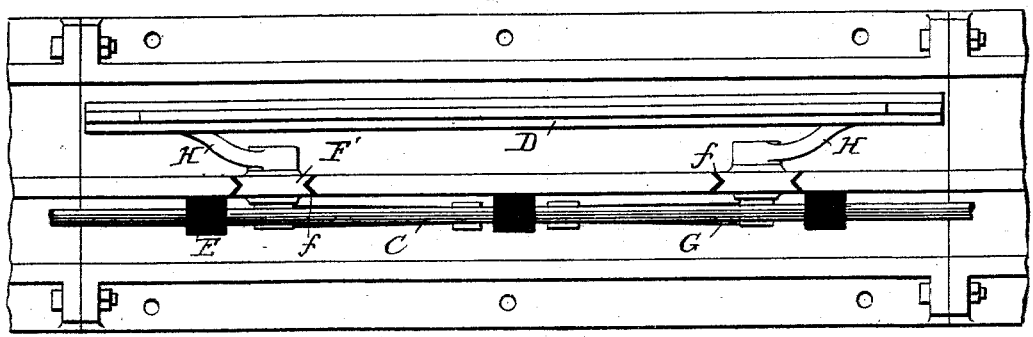
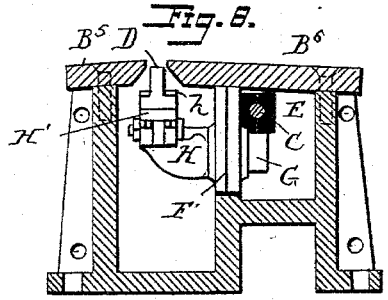
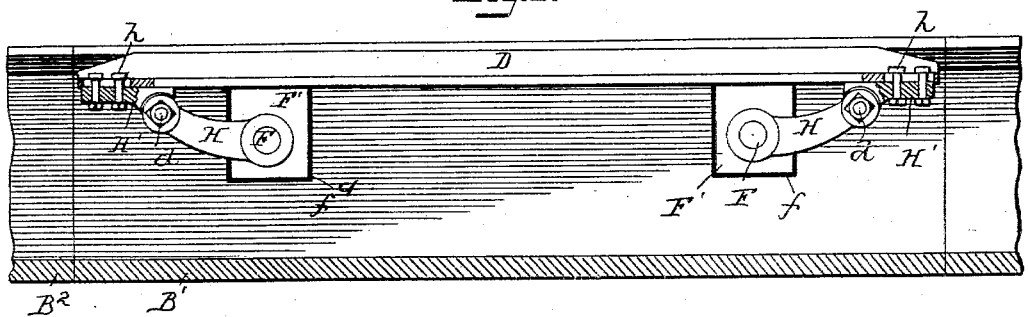

(No Model.) 4 Sheets—Sheet 4.
C. D. MATTISON.
CONDUIT FOR ELECTRIC RAILWAYS.
No. 565,085. Patented Aug. 4, 1896.
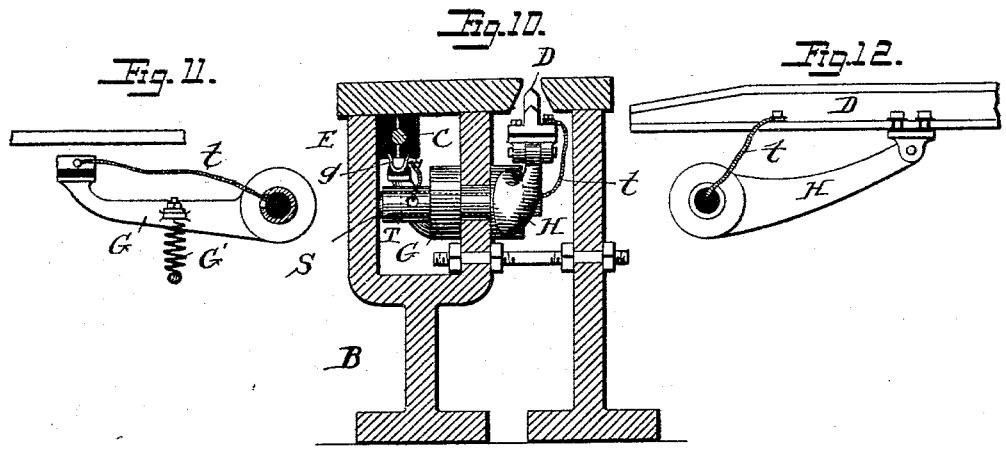
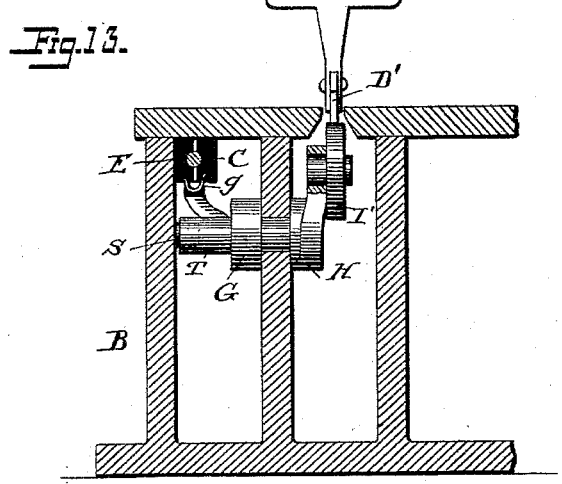
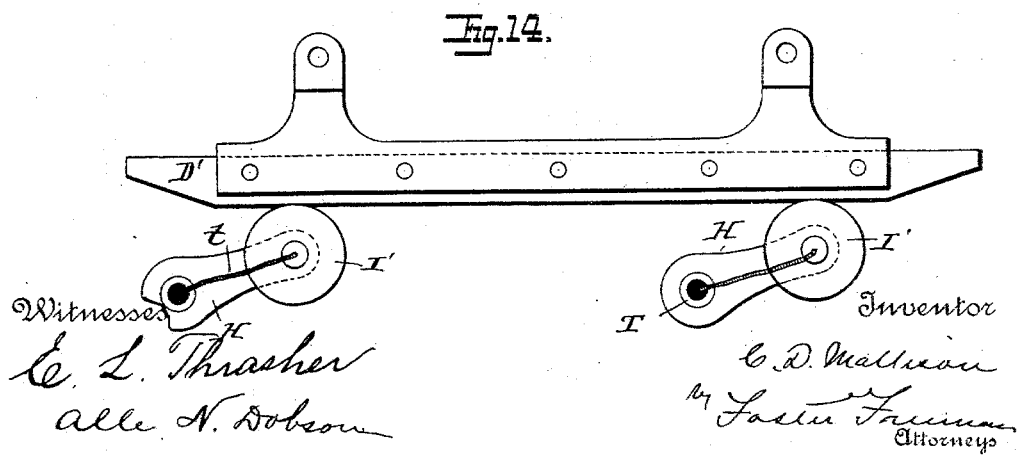
Witnesses
E. L. Thrasher
Alle N. Dobson
Inventor
C. D. Mattison
by Foster Freeman
Attorneys

UNITED STATES PATENT OFFICE.

CHARLES D. MATTISON, OF NEW YORK, N. Y., ASSIGNOR TO HARVEY L. LUFKIN, OF SAME PLACE.

CONDUIT FOR ELECTRIC RAILWAYS.

SPECIFICATION forming part of Letters Patent No. 565,085, dated August 4, 1896.

Application filed February 23, 1892. Serial No. 422,496. (No model.)

*To all whom it may concern:*

Be it known that I, CHARLES D. MATTISON, a citizen of the United States, residing at New York, in the county and State of New York, have invented certain new and useful Improvements in Conduits for Electric Railways, of which the following is a specification.

My invention relates to electric railways, and more especially to that class of electric railways in which the conductor furnishing the current to propel the cars is arranged in a conduit and is adapted to be connected automatically with the car as the car passes over the track.

It has for its object to provide a simple, cheap, and effective means whereby this may be accomplished; and it consists in the features of construction, arrangement, and mode of operation substantially such as are herein more particularly pointed out.

In the accompanying drawings I have shown the preferred embodiment of my invention, in which—

Figure 1:
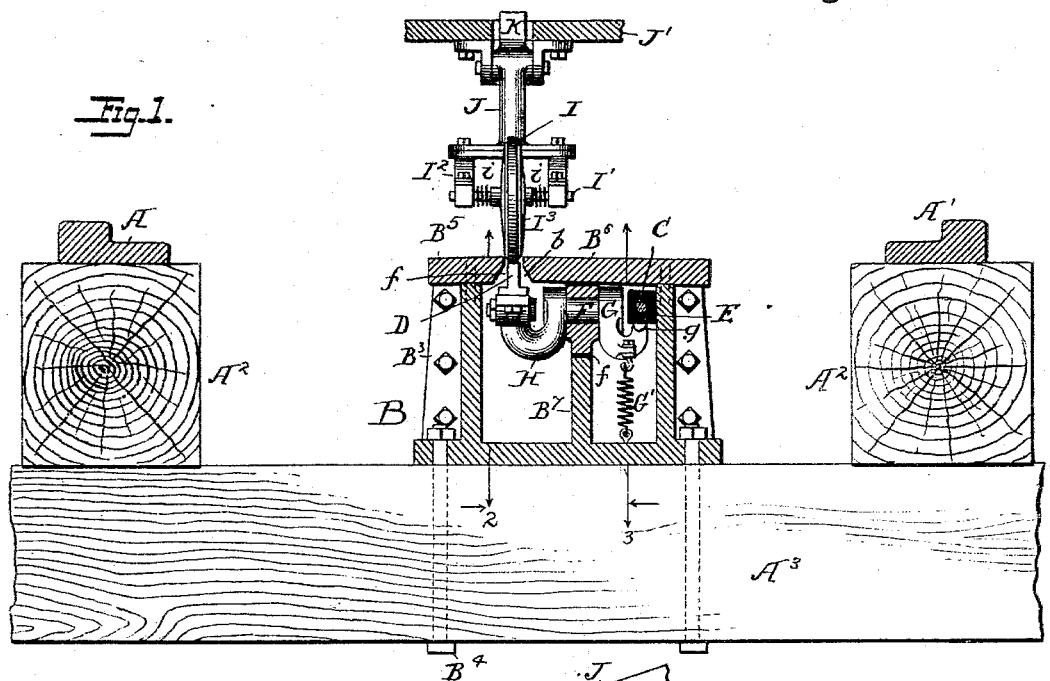
Figure 2:
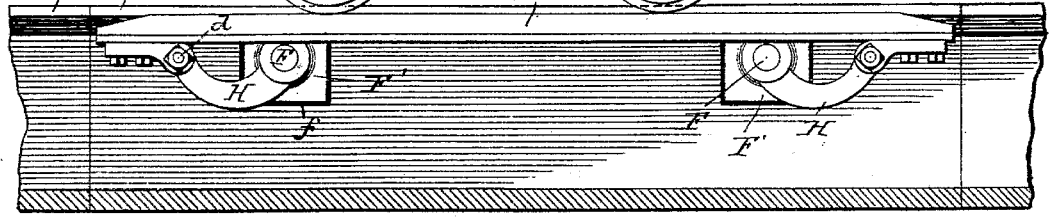
Figure 3:
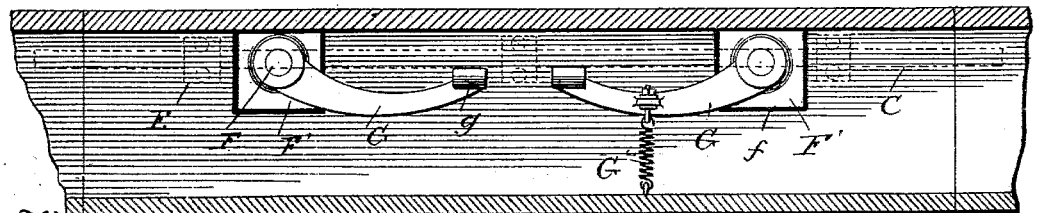
Figure 4:
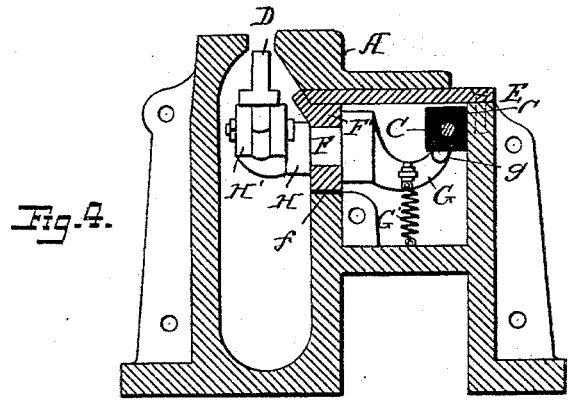
Figure 5:
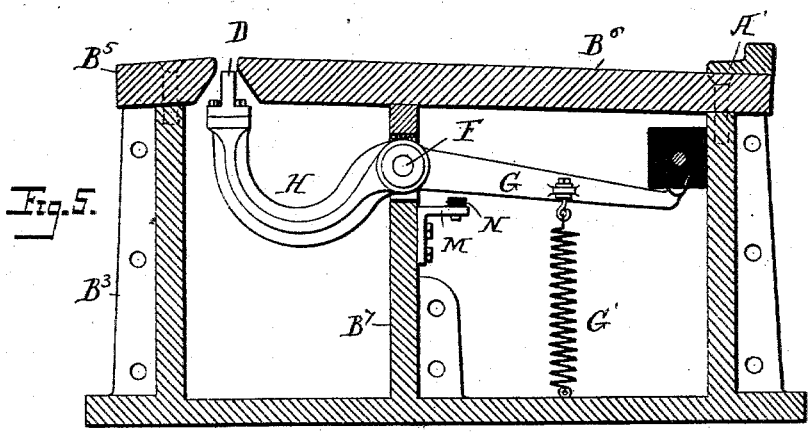
Figure 6:
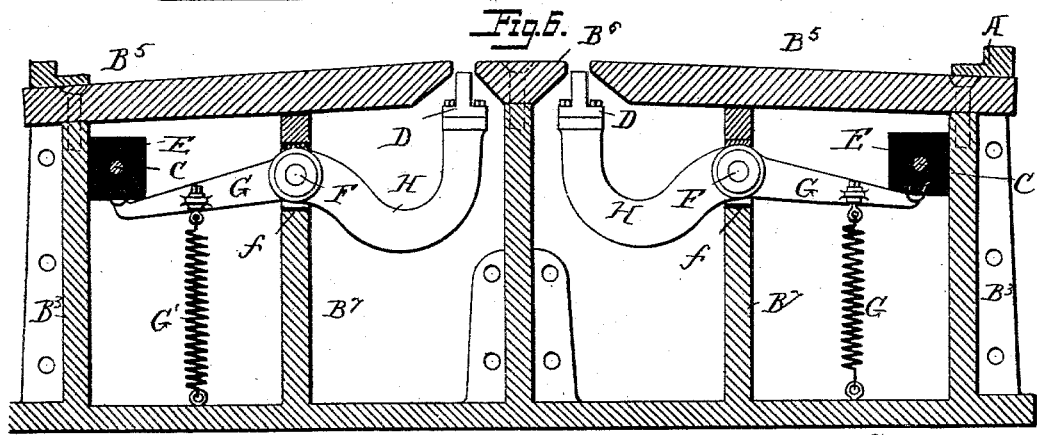

Figure 1 is a transverse section of an electric railway having my improvement applied thereto. Fig. 2 is a longitudinal section of the conduit on the line 2 2, Fig. 1. Fig. 3 is a similar longitudinal section on the line 3 3, Fig. 1. Fig. 4 is a transverse section of a conduit of different construction. Figs. 5 and 6 are transverse views of a single and double conduit, showing a modification of the connecting apparatus. Figs. 7, 8, and 9 are respectively plan, cross-section, and longitudinal section of another form of conduit. Figs. 10 to 14 are detail views of modifications.

In the large and growing use of electricity as applied to propelling cars it is becoming more and more necessary to provide some suitable means whereby the conductor or conductors furnishing the supply of current to the motors on the cars can be arranged in a conduit under or adjacent to the track, and thus avoid the dangers and inconveniences due to overhead conductors. It is also desirable to provide means whereby the current should be furnished directly to the motors on the cars from the conductor, and supplied to it as it passes over the track, while the track in front and rear of the car is not supplied with electricity. The reasons for this are apparent to those skilled in the art and need be recited, more than to remark that in this way waste of current can be avoided as well as danger of accident. It is also practically necessary in a conduit for electric railways, especially where the ground is used for the return-circuit, to maintain the insulated pole or conductor of the circuit in a perfectly, continuously dry, and thoroughly-insulated condition, free from any possible collection of dirt and refuse or other deleterious matter from the street above.

It is with these objects in view, as well as others which need not be mentioned, that I have designed my improved conduit.

In the accompanying drawings, A A' represent the rails of an ordinary tram-railway which are mounted on the sleepers $A^2$, which may be supported upon the ties $A^3$, or they may be mounted in any other well-known and usual manner. Arranged adjacent to the track, and preferably between the rails, as shown in Fig. 1, is a conduit B, and while this may be variously constructed and of different material, I preferably make use of a metallic conduit, which can be made in sections, as B' $B^2$, Fig. 2. These sections are provided with flanges or ribs $B^3$, by means of which they may be bolted together to form a substantially continuous conduit, and, if the ties $A^3$ are used, the conduit can be secured to the ties by bolts $B^4$ or otherwise. The top of the conduit is made in sections $B^5$ and $B^6$, which may be secured in a manner to be readily removable, as by means of screws, as indicated, and the inner edges of these top portions are preferably chamfered, as at *b*, and are so arranged as to leave a slot or passage S between them.

The body of the conduit is provided with a partition $B^7$, separating it into two compartments, in one of which is placed the main conductor or feeder C. This compartment is preferably practically air and water tight, while the other compartment contains the contact or trolley rail or rails D, and is open to the air, and the lower part of this compartment may be utilized as a sewer or passage for the water from the street, or as a receptacle for steam, gas, or other pipes usually laid in the street.

The conductor C may be a bare or insulated conductor, preferably of copper, and is supported at suitable intervals by some insulating-bearings E, the insulation of the conductor being accomplished my maintaining it in dry air, which is found to be one of the most effective and practical means of insulating such conductors. The parts of the sealed portion of the conduit may be united by means of any suitable cement or other sealing material to render them practically impervious to air or moisture.

Mounted in the partition $B^7$ is a shaft or arbor F, and this is insulated from the partition in any suitable way, as by the insulating material $f$, and, while this may surround the arbor itself, I preferably mount the arbor in blocks F', which may be thicker than the partition, so as to furnish a good bearing, and insulate the blocks from the contiguous portions of the wall or partition of the conduit. Attached to one end of this shaft or arbor, and arranged in the closed portion of the conduit, is a contact-arm G, preferably provided at its ends with spring-contacts $g$, which are arranged to make a sliding and spring contact with the conductor when brought into proper position, but which are normally held out of contact by the weight of the arm or, if necessary, by means of a spring, as G'.

Mounted upon the other end of the arbor is an arm H, and this arm is connected to the contact or trolley rail or conductor D in any suitable manner, as by the bolt $d$, and in order to permit the movement of this conductor-rail I make a sliding or loose joint between the arm H and rail D, as, for instance, in the manner indicated in Fig. 9, where the bolts $h$, securing the block H', to which the arm H is pivoted, slide in slots in the rail D. This rail D is preferably made of T-iron, held in a reverse position, as shown in the drawings, so that its upper surface is slightly below the level of the covers of the conduit. This rail is made in sections of the desired length, mounted on two or more arms H, and in the normal position the contacts $g$ are held away from the main conductor, and the trolley-rail practically fills the slot between the removable covers of a conduit.

To make use of this conductor in the most economical way, I provide a trolley-wheel I, which is connected to some portion of the car or truck thereof, as by means of the arm J, which is shown hinged to the portion J' of the car, and as being provided with an extended arm or handle K, by means of which the trolley can be lifted or depressed. The trolley-wheels are preferably supported on a spring-bearing, which may be in any form, but I have shown an ordinary spring L connected to the arm J, but insulated therefrom, and this spring compensates for the jolting or motion of the car or truck owing to the unevenness of the track.

The trolley-wheels are loosely mounted on shafts I', supported in hangers $I^2$, and between the hangers and hub of the wheel I interpose springs $i$, which compensate for the vibration of the car laterally, and serve to keep the trolley in position in the slot in rounding curves or passing switches or other variations in the track.

The trolley-wheels are provided with guards $I^3$, secured to the sides thereof, but preferably insulated therefrom, and these prevent contact and wear of the trolley against the sides of the slot.

In the arrangement thus described it will be seen that the arbor or shaft carrying the contact-arms is arranged transversely to the partition of the conduit, so that the arms move in a plane parallel to the partition, and while this is the preferred construction, in some instances, I have shown in Figs. 5 and 6, for instance, another way of arranging the contact-arms in which the shaft or arbor F is arranged longitudinally of the partition, and the contact-arm G extends at right angles thereto. This construction is open to some objections, in that it is more difficult to make an air-tight or close joint in the partition, it being necessary to furnish it with some suitable packing. When the conduit is extended the whole width of the track, so that it furnishes a support for the rails A, this is a preferable construction. In order to prevent the trolley conductor or rail from coming directly in contact with the sides of the slot in the cover, I sometimes provide a bracket M, Fig. 5, upon which is mounted an insulating-stop N, which forms a support for the contact-arm when in its normal position.

In Fig. 10, and in the details, Figs. 11 and 12, I have shown another form and arrangement of parts in which the contact-arms are mounted on a tube or pipe T, passing through one of the walls of the conduit, which I find is a simple, convenient, and inexpensive means of furnishing a bearing for the contact-arms, as well as arranging the electrical connections. This tube besides having a bearing in the partition may also have an internal bearing on the stud S, projecting inwardly from one of the outer walls, and in this way I provide a firm support for the bearing. Further, from this construction I find it more convenient to insulate the electrical connections. Thus, for instance, the conductor $t$ may be connected directly to the contact-piece $g$, which is insulated from the contact-carrying arm G, and this conductor $t$ may pass through an opening in the side of the tube, and thence through the tube, and be attached directly to the trolley or rail conductor D, which is also insulated from its supporting-arm H. It will be seen that I thus obtain a direct electric connection between the contact C and the trolley-rail through the medium of the insulated conductor $t$, avoiding resistance to the current and liability of leakage.

It is evident also that instead of having a long trolley rail or conductor arranged within the conduit, the conductor D', Figs. 13 and 14, may be attached to the car or truck and project into the slot in the conduit, while the contact-arms H may be provided with wheels or rollers I', and it will be obvious that the trolley-rail attached to the car should be long enough to extend between two adjacent wheels I', so as to make contact with one before breaking with the other.

It will be observed that with each form of device herein represented the contact for the feed-conductor and the arms which carry or support the trolley-contact are united by an arbor or shaft, which has its bearing in the central partition, and which bearing is at one side of the said feed-conductor and comprises a simple insulating-bushing permitting the proper movement of the arbor or shaft. This latter only requires to be oscillated or rocked back and forth but slightly, and it will be noted that no extra space has to be cut or provided to permit of the necessary movement of the arms carried by said shaft, as is the case where the arms which carry the trolley and feed wire contacts are simply pivoted either in the bottom or side wall of the closed compartment of the conduit.

Other modifications in the details of construction and arrangement may be made and will readily suggest themselves to those skilled in the art, and, while I have described and illustrated the preferred embodiment of my invention, it will be evident that it can be adapted to different features of construction and arrangement without departing from the essentials of the invention.

What I claim is—

1. A conduit for electrical railways comprising two compartments divided by a longitudinal partition, in one of which is arranged the feed-conductor, and the other of which contains the trolley-contact, an arbor mounted in said partition and carrying the contact-arms for the conductor and the supporting-arms for the trolley-contact, and the trolley-rail section having a sliding connection with said supporting-arms, substantially as shown and for the purpose described.

2. A conduit for electrical railways comprising two compartments divided by a longitudinal partition, in one of which is arranged the feed-conductor, and in the other of which is arranged the trolley-contact, an arbor mounted in said partition and carrying the contract-arms for the conductor and the supporting-arms for the trolley-contact, and the trolley-rail section having a movable connection with said latter arms, the said arbor being arranged or adapted to rock in its bearings in the partition, substantially as described.

3. In a conduit for electric railways, having a partition forming two compartments, the combination of a bushing or bearing-block supported by the partition and insulated therefrom, a shaft or arbor rocking in said bushing, a contact-arm carried by one end of the arbor and extending into one of the compartments to be brought to bear upon a feed-conductor therein, and an arm held by the other end of said arbor, a trolley-contact rail in movable connection with said latter arm, and both of said arms extending substantially parallel with the partition, substantially as described.

4. In an electric conduit, the combination with the conductor arranged in an air-tight compartment, of the trolley-rail section arranged in another compartment, a rock-shaft carrying arms which support the trolley-rail section, a movable or sliding joint between said section and said arms, and a contact-arm carrying spring-contacts arranged to engage the conductor, substantially as described.

5. A closed electric conduit containing a conductor mounted in insulated supports in the conduit, a contact-carrying arm mounted in one of the side walls of the conduit, and having a rocking motion and arranged to make contact with the conductor, and trolley-contact arms supporting a contact-rail and having a movable connection therewith, substantially as described.

6. A conduit for electrical railways comprising two compartments divided by a longitudinal partition, one of said compartments having in its top a continuous slot and containing or inclosing the trolley-contact, a feed-conductor arranged and supported in the other compartment, an arbor mounted in said partition and carrying the contact-arms and the supporting-arms for the trolley-contact, and an inverted T-shaped trolley-rail section having movable connection with said latter arms, and the vertically-disposed portion of which practically maintains the slot of the conduit in a closed condition, substantially as shown and for the purpose described.

7. In an electric conduit of the character herein described, the combination with the supporting-arms H and the trolley-rail section D, of the movable or sliding joint by which the two are held together, substantially as described.

8. In an electric conduit of the character herein described, the combination with the supporting-arms H, and the trolley-rail section D having at each end of the slots, the securing-blocks H' to which the ends of the arms H are pivoted, and the bolts working in the slots, substantially as described.

9. A conduit for electric railways having a longitudinal partition dividing the same into two compartments, the feed-conductor in one compartment, and the trolley-rail sections in the other, an arbor mounted in said partition approximately in the same horizontal plane as the feed-conductor, contact-arms carried by the inner end of the arbor, and the supporting-arms for the trolley-rail sections carried by the outer end thereof, the said arbor being arranged to rock in the partition, and the said trolley-rail sections being in movable connection with their supporting-arms, all substantially as shown and described.

10. A conduit for electric railways, comprising two compartments separated by a longitudinal partition, a feeding-conductor arranged air-tight in one of said compartments, arms rocking alongside of said feeding-conductor and having springs making contact with the latter, additional arms in the other compartment rocking simultaneously with the first, and the trolley-rail sections having slots at or near their ends and supported upon said latter arms by means of screws, substantially as described.

In testimony whereof I have signed my name to this specification in the presence of two subscribing witnesses.

CHARLES D. MATTISON.

Witnesses:
A. MITCHELL HALL,
JOSIAH MASON FISKE.